United States Patent
Jeong et al.

(10) Patent No.: US 7,593,486 B2
(45) Date of Patent: Sep. 22, 2009

(54) APPARATUS AND METHOD FOR CONTROLLING TRANSMISSION MODE IN A MIMO MOBILE COMMUNICATION SYSTEM

(75) Inventors: Hong-Sil Jeong, Suwon-si (KR);
Chan-Byoung Chae, Seoul (KR);
Jae-Yoel Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 605 days.

(21) Appl. No.: 11/152,456

(22) Filed: Jun. 14, 2005

(65) Prior Publication Data

US 2005/0276317 A1 Dec. 15, 2005

(30) Foreign Application Priority Data

Jun. 14, 2004 (KR) .................. 10-2004-0043402

(51) Int. Cl.
*H04L 27/00* (2006.01)
*H04L 27/06* (2006.01)
*H04B 1/10* (2006.01)

(52) U.S. Cl. .................. 375/324; 375/316; 375/345; 375/346; 375/350; 375/295; 375/296; 375/260

(58) Field of Classification Search .............. 375/295, 375/296, 260, 324, 316, 345, 346, 350
See application file for complete search history.

(56) References Cited

U.S. PATENT DOCUMENTS

| | | | | |
|---|---|---|---|---|
| 5,727,033 A * | 3/1998 | Weaver et al. | ............. | 375/358 |
| 6,351,499 B1 | 2/2002 | Paulraj et al. | | |
| 6,549,785 B1 * | 4/2003 | Agin | ........................ | 455/522 |
| 6,748,232 B1 * | 6/2004 | Anderson et al. | ........... | 455/522 |
| 6,754,506 B2 * | 6/2004 | Chang et al. | ............. | 455/522 |
| 6,807,164 B1 * | 10/2004 | Almgren et al. | ............. | 370/342 |
| 7,012,883 B2 * | 3/2006 | Jalali et al. | .................. | 370/208 |
| 7,020,073 B2 * | 3/2006 | Kadous et al. | ............. | 370/208 |
| 7,120,199 B2 * | 10/2006 | Thielecke et al. | ........... | 375/267 |
| 7,164,649 B2 * | 1/2007 | Walton et al. | ............... | 370/203 |
| 7,177,351 B2 * | 2/2007 | Kadous | .................... | 375/225 |
| 7,184,713 B2 * | 2/2007 | Kadous et al. | ........... | 455/67.13 |

(Continued)

FOREIGN PATENT DOCUMENTS

EP 1 255 369 11/2002

(Continued)

OTHER PUBLICATIONS

Zheng et al., "Multiple ARQ Processes for MIMO Systems", EURASIP Journal on Applied Signal Processing, vol. 5, May 1, 2004, pp. 772-782.

*Primary Examiner*—Jason M. Perilla
(74) *Attorney, Agent, or Firm*—The Farrell Law Firm, LLP

(57) ABSTRACT

An apparatus and method for controlling a transmission mode in a MIMO mobile communication system are provided. In a receiver in the MIMO mobile communication system, an error checker checks errors in received data and outputting an error check result. A feedback portion adaptively changes a threshold associated with a channel state according to the error check result, and determines a transmission mode by comparing the changed threshold with a measured CQI, and feeds back transmission mode information to a transmitter.

31 Claims, 10 Drawing Sheets

U.S. PATENT DOCUMENTS

| | | | |
|---|---|---|---|
| 7,197,692 B2* | 3/2007 | Sutivong et al. | 714/796 |
| 2002/0018453 A1* | 2/2002 | Yu et al. | 370/333 |
| 2002/0106010 A1* | 8/2002 | Jones | 375/219 |
| 2002/0111144 A1* | 8/2002 | Schiff | 455/69 |
| 2002/0167907 A1* | 11/2002 | Sarkar et al. | 370/252 |
| 2003/0003863 A1* | 1/2003 | Thielecke et al. | 455/39 |
| 2003/0003880 A1 | 1/2003 | Ling et al. | |
| 2003/0064743 A1* | 4/2003 | Chen | 455/522 |
| 2003/0086371 A1* | 5/2003 | Walton et al. | 370/235 |
| 2003/0095506 A1* | 5/2003 | Jalali et al. | 370/252 |
| 2003/0095508 A1* | 5/2003 | Kadous et al. | 370/252 |
| 2003/0097623 A1* | 5/2003 | Razavilar et al. | 714/704 |
| 2003/0125040 A1 | 7/2003 | Walton et al. | |
| 2003/0128674 A1* | 7/2003 | Kong et al. | 370/320 |
| 2003/0236080 A1* | 12/2003 | Kadous et al. | 455/226.1 |
| 2004/0037235 A1* | 2/2004 | Kadous | 370/253 |
| 2004/0120411 A1* | 6/2004 | Walton et al. | 375/260 |
| 2004/0136349 A1* | 7/2004 | Walton et al. | 370/338 |
| 2004/0184398 A1* | 9/2004 | Walton et al. | 370/203 |
| 2005/0002467 A1* | 1/2005 | Seo et al. | 375/267 |
| 2005/0013352 A1* | 1/2005 | Hottinen | 375/219 |
| 2005/0068918 A1* | 3/2005 | Mantravadi et al. | 370/328 |
| 2005/0120097 A1* | 6/2005 | Walton et al. | 709/220 |
| 2005/0152473 A1* | 7/2005 | Maltsev et al. | 375/299 |
| 2005/0276248 A1* | 12/2005 | Butala et al. | 370/332 |
| 2006/0068826 A1* | 3/2006 | Leonard | 455/522 |
| 2007/0053287 A1* | 3/2007 | Li et al. | 370/229 |
| 2007/0150799 A1* | 6/2007 | Sutivong et al. | 714/796 |
| 2008/0002790 A1* | 1/2008 | Itoh | 375/317 |

FOREIGN PATENT DOCUMENTS

| | | |
|---|---|---|
| WO | WO 02/091657 | 11/2002 |
| WO | WO 2004/049613 | 6/2004 |

* cited by examiner

APPARATUS AND METHOD FOR CONTROLLING TRANSMISSION MODE IN A MIMO MOBILE COMMUNICATION SYSTEM

PRIORITY

This application claims priority under 35 U.S.C. § 119 to an application entitled "Apparatus And Method For Controlling Transmission Mode In A MIMO Mobile Communication System" filed in the Korean Intellectual Property Office on Jun. 14, 2004 and assigned Serial No. 2004-43402, the contents of which are incorporated herein by reference.

BACKGROUND OF THE INVENTION

1. Field of the Invention

The present invention relates generally to a mobile communication system, and in particular, to a transmitting/receiving apparatus and method for ensuring high data rate and high reliability in a multiple-input multiple-output (MIMO) mobile communication system.

2. Description of the Related Art

Adaptive Modulation and Coding (AMC) is actively studied to increase channel capacity in wireless networks. The AMC scheme adapts a modulation scheme and a code rate according to the current signal quality or channel state, while keeping transmit power constant during transmission of one frame, to increase data rate. For example, assume a nearby mobile station (MS) has a small error probability in receiving signals from a base station (BS). The nearby MS uses a high-order modulation scheme such as 16-ary quadrature amplitude modulation (16QAM) in which four bits form one signal, and a high code rate such as ¾. As a remote MS receives signals with a high error probability from the BS, the remote MS uses a low-order modulation scheme and a low code rate to receive signals without errors.

In AMC, the transmission scheme used is decided with respect to a plurality of code rates and modulation schemes depending on what region a signal-to-noise ratio (SNR) measured at a receiver belongs to in an SNR versus throughput graph (or curve). However, the SNR versus throughput graph is derived from a particular fading channel model, which implies that the SNR versus throughput graph may not be viable in a changed fading environment. Accordingly, a need exists for a new method of selecting a transmission scheme.

Typically, multiple antennas are used for two purposes: one is to increase data reliability and the other is to increase data rate. To achieve a higher reliability and a higher data rate, the data reliability increasing scheme is adopted in a bad channel state and the data rate increasing scheme is adopted in a good channel state. Obviously, the adaptive use of a multiple antenna scheme according to a channel state leads to the increase of data rate and data reliability.

In this context, combining the traditional AMC scheme and a multiple transmit/receive antenna scheme has emerged as a significant issue for future communication systems. Satisfactory data rate and reliability can be achieved by optimizing a modulation scheme, a code rate, and an antenna transmission scheme according to a channel state, taking into account both the AMC and the multiple antenna scheme which serve the same purpose.

Technologies of exploiting multiple antennas have been studied to build a high-speed, reliable communication system that maximizes data transmission rate and minimizes an error rate with limited radio resources. These technologies are called space-time processing.

Space-time processing was developed to cope with problems encountered in a wireless environment, such as signal loss and unexpected channel state degradation. With their introduction in the 1960's, beam-forming algorithms are now an area of active study for the purpose of increasing cell capacities and antenna gains on the forward link and the reverse link. As is well known, the Space Time Coding (STC) proposed by Tarokh, et al. in 1997 achieves a diversity effect proportional to the product of the number of transmit and receive antennas.

Considerable efforts have also been made to exploit multiple antennas for increasing data transmission rate as well as for improving reception performance as described above. One of the most prominent data rate increasing methods is spatial multiplexing (SM). The SM is a scheme of transmitting different information data through different transmit antennas. Telta, et al.'s study results reveal that the SM brings as much an increase in capacity as the number of transmit antennas, compared to single-input single-output (SISO). The capacity increase is significant to a high-speed data transmission system.

The STC aims to reduce the error rate of transmission data and the SM is used to maximize the data rate of transmission data. One method that serves both purposes is 2-layered SM. For example, in a system where four transmit antennas act as two transmit antennas by grouping, two STBC blocks corresponding to the two transmit antennas can be connected. In this case, a higher data rate is achieved than in an STBC scheme using four antennas, and a lower error rate than in an SM method using four antennas.

As described above, there exist a variety of MIMO (Multiple-Input Multiple-Output) schemes according to the numbers of transmit antennas and receive antennas in the communication system. Therefore, system capacity depends on which one is selected for data transmission/reception among the various antenna combinations.

Accordingly, a need exists for developing a method of determining an antenna transmission scheme according to a fading channel environment, while still applying the traditional AMC scheme, in a MIMO system.

SUMMARY OF THE INVENTION

An object of the present invention is to substantially solve at least the above problems and/or disadvantages and to provide at least the advantages below. Accordingly, an object of the present invention is to provide an apparatus and method for controlling a code rate, a modulation scheme, and an antenna transmission scheme according to a channel state in a MIMO mobile communication system.

Another object of the present invention is to provide an apparatus and method for changing a criterion to determine a transmission mode according to a channel state and controlling a code rate, a modulation scheme, and an antenna transmission scheme according to the changed criterion in a MIMO mobile communication system.

The above objects are achieved by providing an apparatus and method for controlling a transmission mode in a MIMO mobile communication system. According to an aspect of the present invention, in a receiver in a MIMO mobile communication system, an error checker checks errors in received data and outputs an error check result. A feedback portion adaptively changes a threshold associated with a channel state according to the error check result, and determines a transmission mode by comparing the changed threshold with a measured CQI (Channel Quality Indicator), and feeds back transmission mode information to a transmitter.

According to another aspect of the present invention, in a transmitter in a MIMO mobile communication system, a receiving portion receives a CQI and the error check result of transmitted data from an MS. A controller adaptively changes a threshold associated with a channel state according to the error check result and determines a transmission mode by comparing the changed threshold with the received CQI.

According to a further aspect of the present invention, in a method of adaptively changing a threshold according to a channel state, an existing threshold is used to compare with a CQI for determining a transmission mode, a threshold calculated under a severe-distortion channel environment is set as an initial threshold. If the CRC (Cyclic Redundancy Code) check result of a frame received at a receiver is an ACK, an existing threshold is compared with a predetermined reference value. If the existing threshold is equal to or greater than the reference value, the existing threshold is non-linearly decreased. If the existing threshold is less than the reference value, the existing threshold is linearly decreased. If the CRC check result is a NACK, the existing threshold is changed to the initial threshold.

According to still another aspect of the present invention, in a method of adaptively changing a threshold according to a channel state, the threshold being compared with a CQI for determining a transmission mode, a threshold calculated under a typical channel environment is set as an initial threshold. If the CRC check result of a frame received at a receiver is an ACK, an existing threshold is linearly decreased. If the CRC check result is a NACK, the existing threshold is changed to the initial threshold.

According to still further aspect of the present invention, in a method of adaptively changing a threshold according to a channel state, the threshold being compared with a CQI for determining a transmission mode, a threshold calculated under a severe-distortion channel environment is set as an initial threshold. If the CRC check result of a frame received at a receiver is an ACK, an existing threshold is non-linearly decreased. If the CRC check result is a NACK, it is determined whether a previous CRC check result is an ACK or a NACK. If the previous CRC check result is an ACK, the existing threshold is increased to a predetermined first value. If the previous CRC check result is a NACK, the number of successive NACKs is counted. If the count is less than a predetermined value, the existing threshold is maintained, and if the count is equal to or greater than the predetermined value, the existing threshold is changed to the initial threshold. If an ACK follows, the initial threshold is linearly decreased, and if a NACK follows, the initial threshold is changed to a predetermined second value.

According to yet another aspect of the present invention, in a feeding back method in a receiver in a MIMO mobile communication system, errors are checked in received data and an error check result is output. A threshold associated with a channel state is adaptively changed according to the error check result. A transmission mode is determined by comparing the changed threshold with a measured CQI, and transmission mode information is fed back to a transmitter.

According to yet a further aspect of the present invention, in a transmitting method in a MIMO mobile communication system, a CQI and the error check result of transmitted data are received from a receiver. A threshold associated with a channel state is adaptively changed according to the error check result and a transmission mode is determined by comparing the changed threshold with the received CQI.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a method of changing a criterion to determine a transmission mode according to a channel state and controlling a code rate, a modulation scheme, and an antenna transmission scheme according to the changed criterion in a MIMO mobile communication system.

It is to be appreciated that the following description is made of the present invention in the context of a communication system having a transmitter with four transmit antennas and a receiver with two receive antennas and a communication system having a transmitter with four transmit antennas and a receiver with four receive antennas. Yet, it is clear that there are other various MIMO schemes than those described herein.

While the present invention is applicable to any of frequency division multiple access (FDMA), time division multiple access (TDMA), code division multiple access (CDMA), and orthogonal frequency division multiplexing (OFDM) systems, the OFDM system is taken as an example, for notational simplicity.

Figure 1:
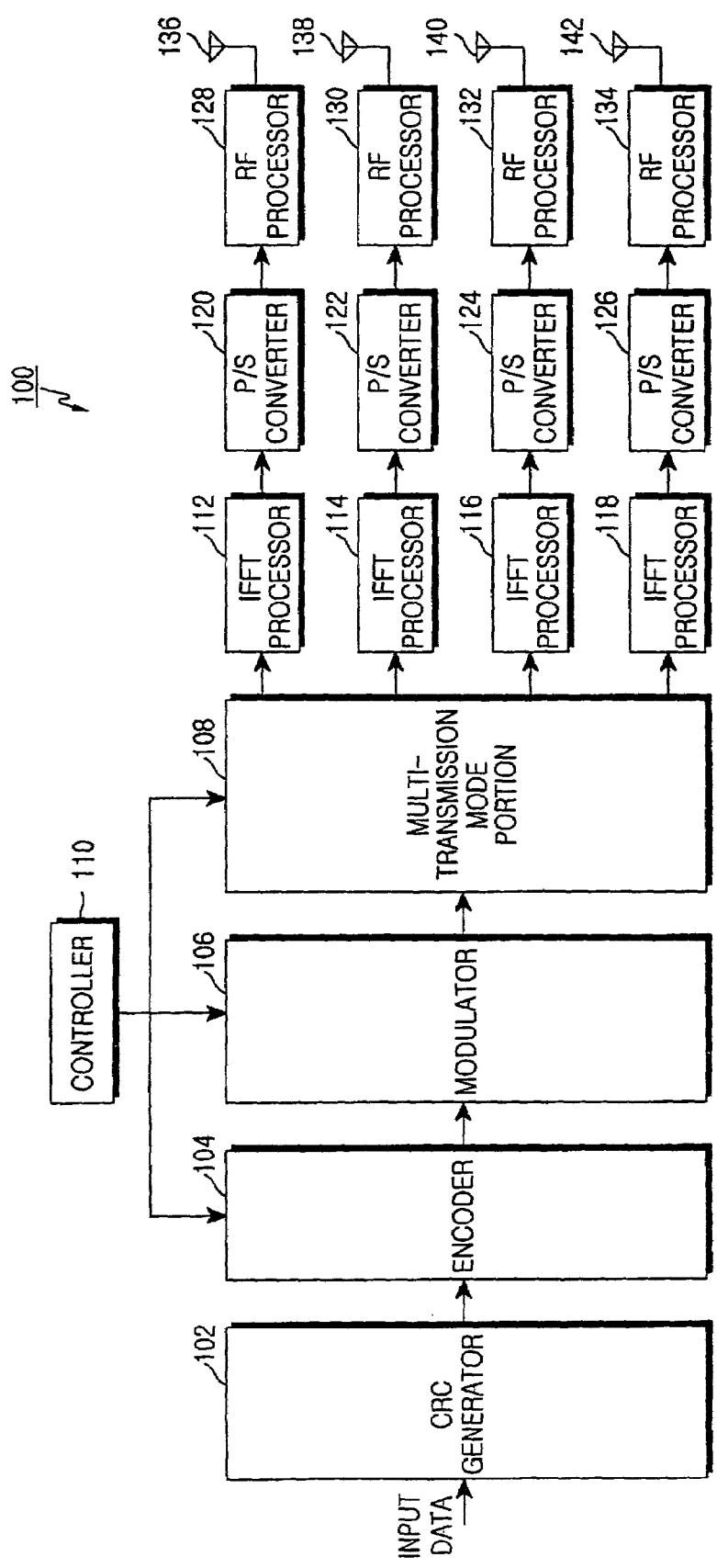
FIG. 1 is a block diagram of a transmitter in an OFDM system according to an embodiment of the present invention.

FIG. 1 is a block diagram of a transmitter in an OFDM system according to an embodiment of the present invention.

Referring to FIG. 1, a transmitter 100 of the present invention includes a cyclic redundancy code (CRC) generator 102, an encoder 104, a modulator 106, a multi-transmission mode portion 108, a controller 110, a plurality of inverse fast Fourier transform (IFFT) processors 112, 114, 116 and 118, a plurality of parallel-to-serial (P/S) converters 120, 122, 124 and 126, a plurality of radio frequency (RF) processors 128, 130, 132 and 134, and a plurality of transmit antennas 136, 138, 140 and 142.

In operation, the controller 110 determines a code rate, a modulation scheme, and an antenna transmission scheme according to feedback information (or transmission mode information) received from a receiver in an MS and correspondingly controls the encoder 104, the modulator 106, and the multi-transmission mode portion 108.

The CRC generator 102 generates a CRC for input transmission data and attaches the CRC to the transmission data. The encoder 104 encodes the CRC-attached data at a predetermined code rate under the control of the controller 110 and outputs a codeword. Here, let the length of an input information word be denoted by k and the code rate that the controller 110 tells the encoder 104 be denoted by R. Then, the length of the codeword is n (=k/R). The encoder 104 can be a convolutional encoder, a turbo encoder, or an LDPC (Low Density Parity Check) encoder.

The modulator 106 modulates the coded data in a predetermined modulation scheme under the control of the controller 110. Specifically, the modulator 106 maps the input data into modulation symbols in accordance with the signal constellation of a modulation scheme (or a modulation order) that the controller 110 tells the modulator 106. The modulator 106 supports binary phase shift keying (BPSK), quadrature phase shift keying (QPSK), 8-quadrature phase shift keying (8-PSK), and 16QAM. One bit (s=1) is mapped to one complex signal in BPSK, two bits (s=2) to one complex signal in QPSK, three bits (s=3) to one complex signal in 8PSK, and four bits (s=4) to one complex signal in 16QAM.

The multi-transmission mode portion 108 encodes the modulation symbols in a predetermined method under the control of the controller 110, thereby producing a plurality of antenna signals. These antenna signals are provided respectively to their corresponding IFFT processors 112 to 118. Operations of the multi-transmission mode portion 108 will be described later in great detail with reference to FIGS. 2A, 2B and 2C.

The IFFT processors 112 to 118 IFFT-process the received data. The P/S (Parallel to Serial) converters 120 to 126 serialize the IFFT signals received from their corresponding IFFT processors 112 to 118.

The RF processors 128 to 134 convert the serial data received from their corresponding P/S converters 120 to 126 to analog signals, RF-process the analog signals, and output them to their corresponding transmit antennas 136 to 142. The RF processors 128 to 134 each include a filter and a front-end unit.

The transmit antennas 136 to 142 radiate the received signals over the air. Specifically, the RF signal from the RF processor 128 is transmitted through the first transmit antenna 136, the RF signal from the RF processor 130 is transmitted through the second transmit antenna 138, the RF signal from the RF processor 132 is transmitted through the third transmit antenna 140, and the RF signal from the RF processor 134 is transmitted through the fourth transmit antenna 142.

Figure 2A:
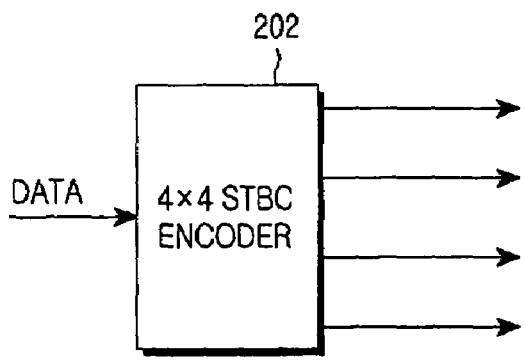
FIGS. 2A, 2B and 2C are diagrammatic representations of operations of a multi-transmission mode portion illustrated in FIG. 1.
Figure 2B:
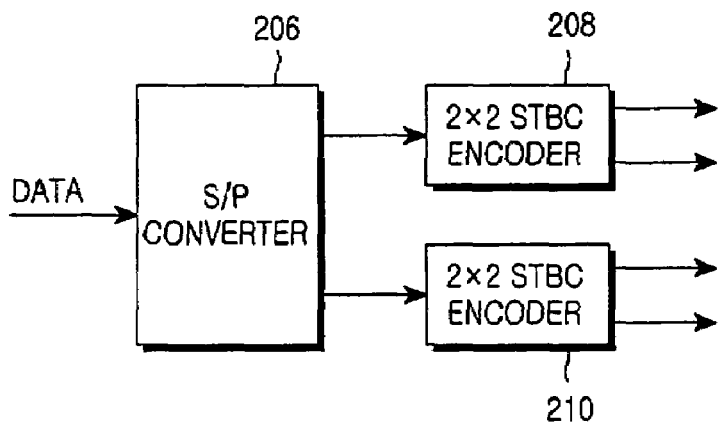
Figure 2C:
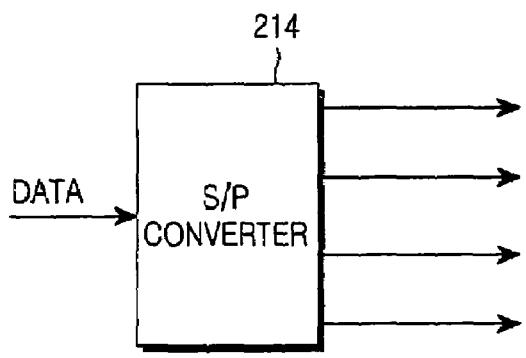

FIGS. 2A, 2B and 2C are diagrammatic representations of operations of the multi-transmission mode portion 108 illustrated in FIG. 1. Specifically, FIG. 2A is a block diagram of the multi-transmission mode portion 108 in the case where it operates in space-time block coding (STBC), FIG. 2B is a block diagram of the multi-transmission mode portion 108 in the case where it operates in 2-layered spatial multiplexing (SM), and FIG. 2C is a block diagram of the multi-transmission mode portion 108 in the case where it operates in SM.

Referring to FIG. 2A, the multi-transmission mode portion 108 needs a 4×4 STBC encoder 202, for STBC operation. The 4×4 STBC encoder 202 encodes the modulation symbols received from the modulator 106 in such a manner that four modulation symbols can be transmitted through four transmit antennas in four time intervals. In the OFDM system, four modulation symbols forming one antenna signal are mapped to predetermined four subcarriers or carried over predetermined two subcarriers for two time periods, rather than they are transmitted for four time periods.

Referring to FIG. 2B, for 2-layered SM, the multi-transmission mode portion 108 needs a serial-to-parallel (S/P) converter 206 and two 2×2 STBC encoders 208 and 210. The S/P converter 206 parallelizes the serial modulation symbols received from the modulator 106 illustrated in FIG. 1 and outputs odd-numbered modulation symbols to the first 2×2 STBC encoder 208 and even-numbered modulation symbols to the second 2×2 STBC encoder 210. The 2×2 STBC encoders 208 and 210 encode the input symbols so that two input symbols can be transmitted through two antennas for two time periods. In the OFDM system, two symbols forming one antenna signal are mapped to predetermined two subcarriers or carried over predetermined one subcarrier for two time periods, rather than they are transmitted just for two time periods.

Referring to FIG. 2C, for SM operation, the multi-transmission mode portion 108 needs an S/P converter 214. The S/P converter 214 parallelizes the serial modulation symbols received from the modulator 106 illustrated in FIG. 1 and outputs the parallel modulation symbols to four antennas so that four modulation symbols can be transmitted through the four respective antennas for one time period.

The multi-transmission mode portion 108 is so configured as to support the above three antenna transmission schemes. Yet, the antenna transmission schemes are merely exemplary applications to which the multi-transmission mode portion 108 is not limited.

For four transmit antennas, for instance, the three antenna transmission schemes have the following characteristics.

TABLE 1

|  | STBC | 2-layered SM | SM |
|---|---|---|---|
| Data rate | 1 | 2 | 4 |
| Diversity gain | 4 | 2 | None |

As noted from Table 1, the STBC is lowest in terms of data rate but highest in terms of diversity gain. On the other hand, the SM is highest in terms of data rate but lowest in terms of diversity gain. It is preferred, therefore, that a higher-rate antenna transmission scheme like the SM is used with a good channel state and a high-diversity gain antenna scheme like the STBC is used with a bad channel state.

Now a description will be made of the configuration of a receiver being the counterpart of the transmitter 100.

Figure 3:
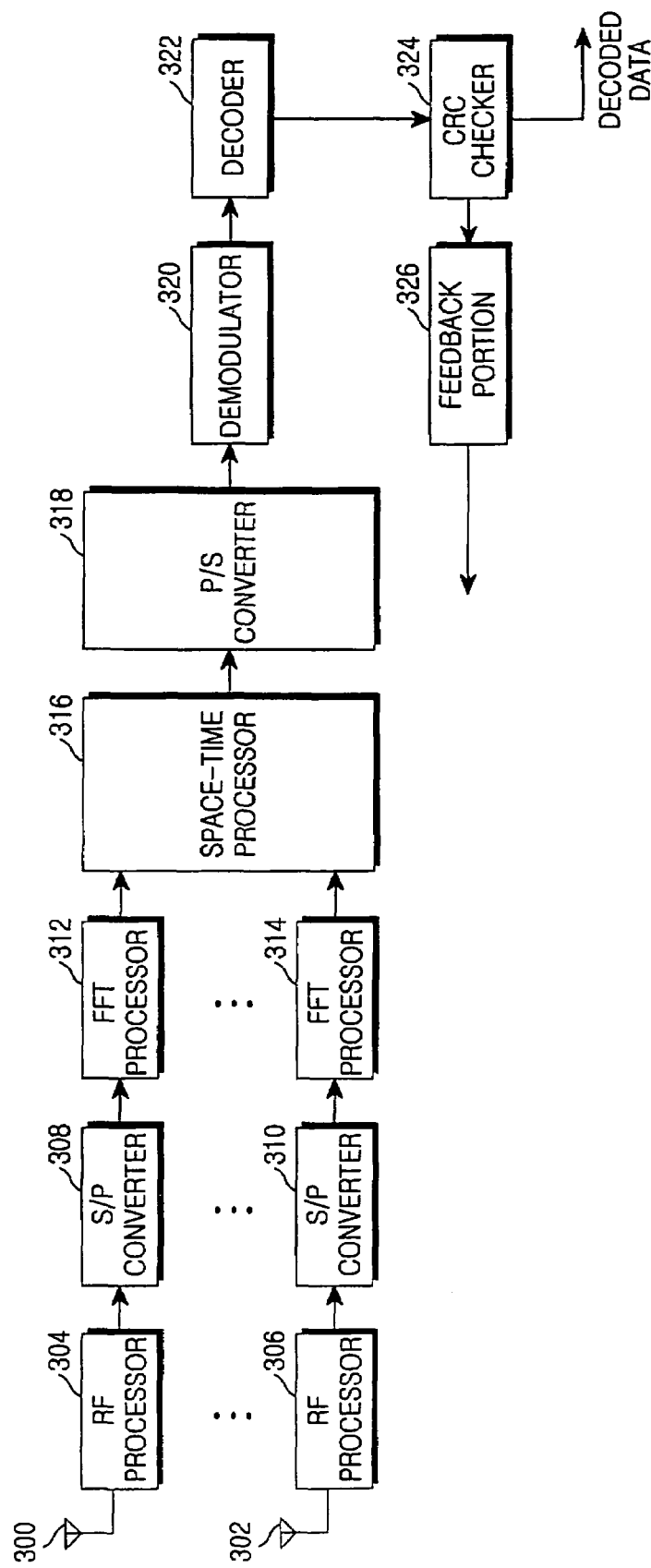
FIG. 3 is a block diagram of a receiver in the OFDM system according to an embodiment of the present invention.

FIG. 3 is a block diagram of a receiver in the OFDM system according to the embodiment of the present invention.

Referring to FIG. 3, the receiver of the present invention includes a plurality of receive antennas 300 to 302, a plurality of RF processors 304 to 306, a plurality of S/P converters 308 to 310, a plurality of fast Fourier transform (FFT) processors 312 to 314, a space-time processor 316, a P/S (Parallel to Serial) converter 318, a demodulator 320, a decoder 322, a CRC checker 324, and a feedback portion 326.

In operation, the RF processors 304 to 306 downconvert signals received from the transmit antennas 136 to 142 of the transmitter 100 through the receive antennas 300 to 302 to intermediate frequency (IF) signals and then to baseband signals, and convert the analog baseband signals to digital signals.

The S/P converters 308 to 310 parallelize the serial data received from their corresponding RF processors 304 to 306. The FFT processors 312 to 314 FFT-process the parallel data received from their corresponding P/S converters 308 to 310.

The space-time processor 316 decodes the FFT signals in a predetermined method corresponding to the transmission scheme of the multi-transmission mode portion 108 in the transmitter 100, thereby estimating the input signal of the multi-transmission mode portion 108.

The P/S converter 318 serializes the parallel data received from the space-time processor 316. The demodulator 320 demodulates the serial data, thereby estimating bits mapped to modulation symbols.

The decoder 322 decodes the demodulated data in accordance with the operation of the encoder 104 and outputs an information word including a CRC to the CRC checker 324. That is, the decoder 322 determines the information bits input to the encoder 104.

The CRC checker 324 checks the CRC of the decoded data on the basis of a predetermined data unit, for example, on a frame basis in order to determine whether the decoded data is identical to the input data of the transmitter 100. If they are identical, no CRC error is generated. If they are different, a CRC error occurs. The CRC check result (acknowledgement: ACK or non-acknowledgement: NACK) is provided to the feedback portion 326. In the absence of a CRC error, the decoded data is output.

The feedback portion 326 determines feedback information (i.e., transmission mode information) to be transmitted to the transmitter 100 according to the CRC check result. The transmission mode information is used to determine an AMC level and/or an antenna transmission scheme.

Figure 4:
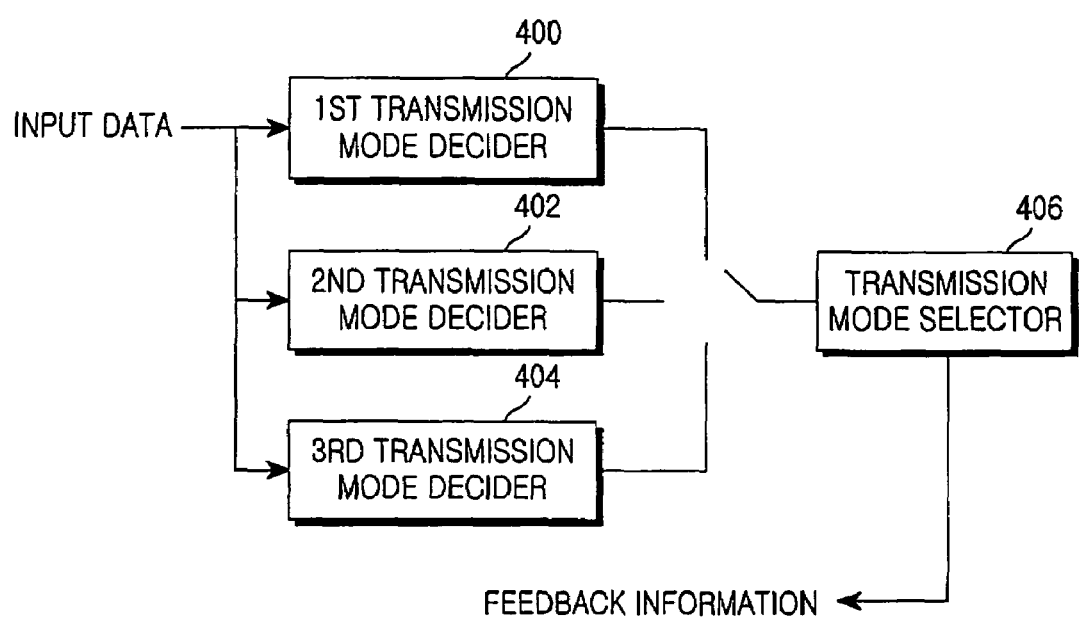
FIG. 4 is a detailed block diagram of a feedback portion illustrated in FIG. 3.

FIG. 4 is a detailed block diagram of the feedback portion 326 illustrated in FIG. 3.

Referring to FIG. 4, the feedback portion 326 is comprised of a first transmission mode decider 400, a second transmission mode decider 402, a third transmission mode decider 404, and a transmission mode selector 406. The operations of the first, second and third transmission mode deciders 400, 402 and 404 will be described later in great detail with reference to FIGS. 5A & 5B, 6A & 6B and 7A & 7B, respectively.

In operation, the first, second and third transmission mode deciders 400, 402 and 404 channel-adaptively change thresholds in different manners according to the CRC check result from the CRC checker 220, compare the changed thresholds with an SNR as a channel quality indicator (CQI) measurement, and decide on a transmission mode according to the comparison results. As described above, the receiver decides on a transmission mode using an SNR versus throughput graph illustrating the mapping relationship between SNR measurements and transmission modes. For example, if an SNR measurement is less than a predetermined threshold, a first transmission mode is chosen and if the SNR measurement is larger than the threshold, a second transmission mode is chosen, referring to the SNR versus throughput graph.

The SNR versus throughput graph (or the threshold) is confined to a particular channel model and thus may not be appropriate under a changed fading environment. Accordingly, the present invention characteristically changes the threshold according to the CRC check result of received data and decides on a transmission mode based on the changed threshold. Adaptation of the SNR versus throughput graph (or the threshold) to the current channel state leads to more reliable decision on a transmission mode. Thus, the transmission mode deciders 400, 402 and 404 each have a memory table associated with a predetermined SNR versus throughput curve, adjust thresholds that divide the curve into a plurality of regions according to the CRC check result, and determine a curve area corresponding to the SNR measurement, thereby determining a transmission mode.

The transmission mode selector 406 selects one of the outputs of the first, second and third transmission mode deciders 400, 402 and 404 and feeds back information about the selected transmission mode to the transmitter. As stated earlier, the transmission mode information includes at least one of a coding method, a modulation scheme, and an antenna transmission scheme. In real implementation, all or at least one of the three transmission mode deciders 400, 402 and 404 may be provided to the receiver. If it has a plurality of transmission mode deciders, the receiver determines a transmission mode by selecting one of the transmission mode deciders under a given situation.

Figure 5A:
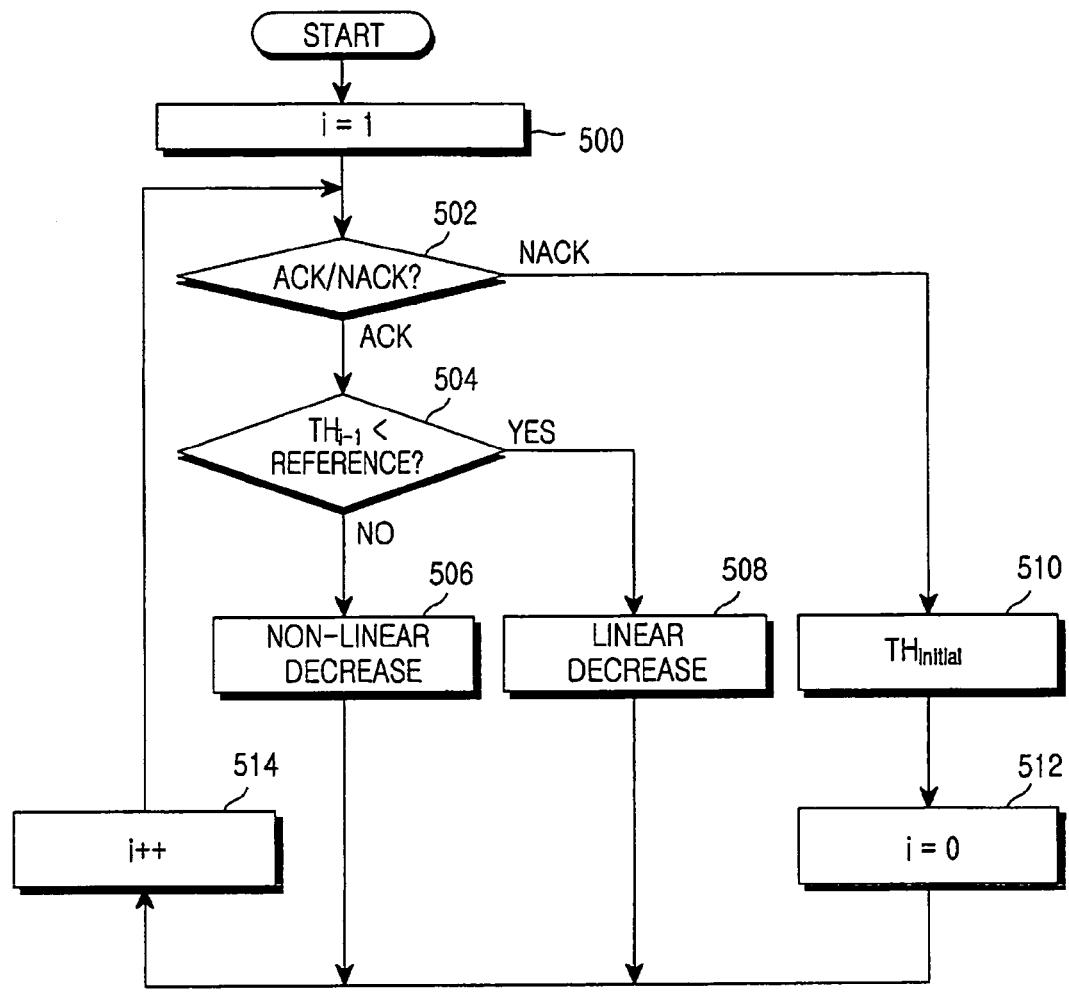
FIG. 5A is a flowchart illustrating a threshold determining operation in the first transmission mode decider illustrated in FIG. 4.

FIG. 5A is a flowchart illustrating a threshold determining operation in the first transmission mode decider 400.

Referring to FIG. 5A, the first transmission mode decider 400 sets a time index i to 1 to start communications in step 500. For the first frame or feedback information, the first transmission mode decider 400 determines a transmission mode based on an initial threshold $TH_{initial}$ calculated under a severe-distortion channel environment such as an AWGN (Additive White Noise) channel environment. For the following frames, the first transmission mode decider 400 determines a threshold in the following way in order to decide on a transmission mode.

The first transmission mode decider 400 first checks the CRC check result received from the CRC checker 324 in step 502. If the CRC check result is an ACK, the first transmission mode decider 400 compares a predetermined reference value with an existing threshold, $TH_{i-1}$ in step 504. If the existing threshold, $TH_{i-1}$ is equal to or larger than the reference value ($TH_{i-1}$ reference), the first transmission mode decider 400 calculates a new threshold, $TH_i$ non-linearly in step 506 and proceeds to step 514. Specifically, the first transmission mode decider 400 subtracts the product of a predetermined value $\Delta$ and the time index i from the existing threshold $TH_{i-1}$, thereby producing the new threshold, $TH_i$, as set forth in Equation (1):

$$TH_i = TH_{i-1} - \Delta \times i \qquad (1)$$

If the existing threshold $TH_{i-1}$ is less than the reference value ($TH_{i-1}$ <reference), the first transmission mode decider 400 calculates a new threshold, $TH_i$ by the following Equation (2) in step 508 and proceeds to step 514.

$$TH_i = TH_{i-1} - \Delta \qquad (2)$$

On the other hand, in the case of a NACK in step 502, the first transmission mode decider 400 sets the initial threshold, $TH_{initial}$ as a new threshold $TH_i$ in step 510. The first transmission mode decider 400 sets the time index i to 0 in step 512 and proceeds to step 514. Thus, in Equation (3):

$$TH_i = TH_{initial} \qquad (3)$$

In step 514, the first transmission mode decider 400 increases the time index i by 1 and returns to step 502.

Figure 5B:
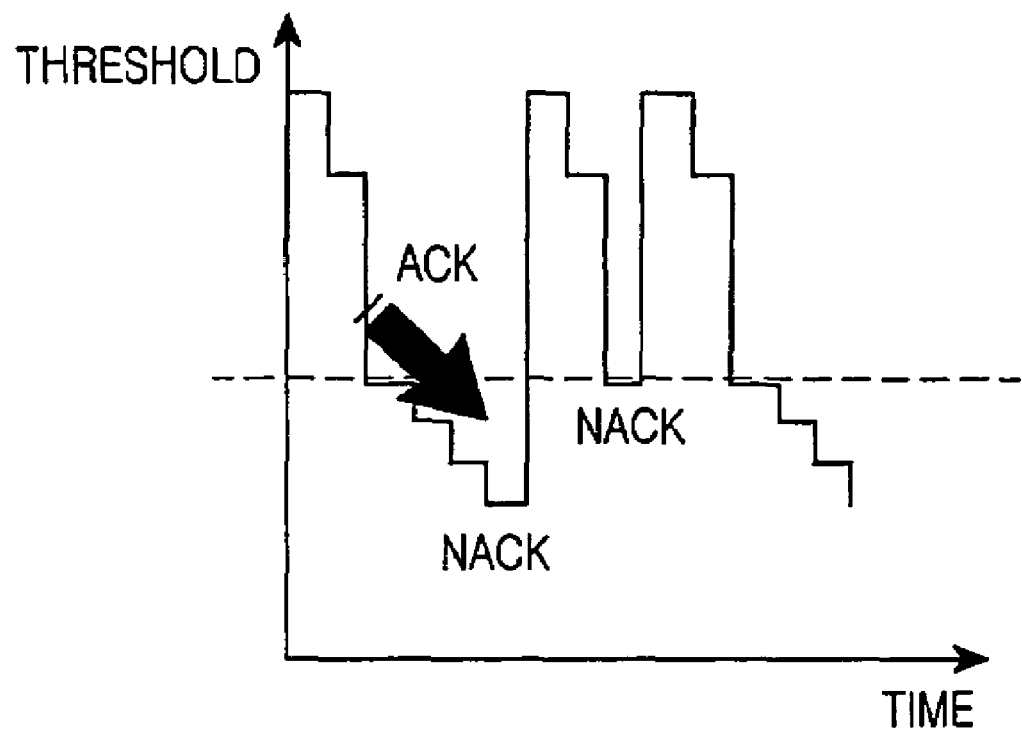
FIG. 5B is a graph illustrating changes in a threshold in accordance with the operation of a first transmission mode decider according to an embodiment of the present invention.

FIG. 5B is a graph illustrating changes in the threshold in accordance with the operation of the first transmission mode decider 400.

Referring to FIG. 5B, communications start using the initial threshold obtained under the severe-distortion channel environment. Then, if the CRC check of a received frame turns out an ACK, an existing threshold is decreased by the product of the predetermined value Δ and the time index i. As successive ACKs drop the threshold below the predetermined reference value, the threshold is decreased by the predetermined value Δ. If a NACK is generated during this operation, the threshold is returned to the initial threshold and then decreased again in the method described above.

Figure 6A:
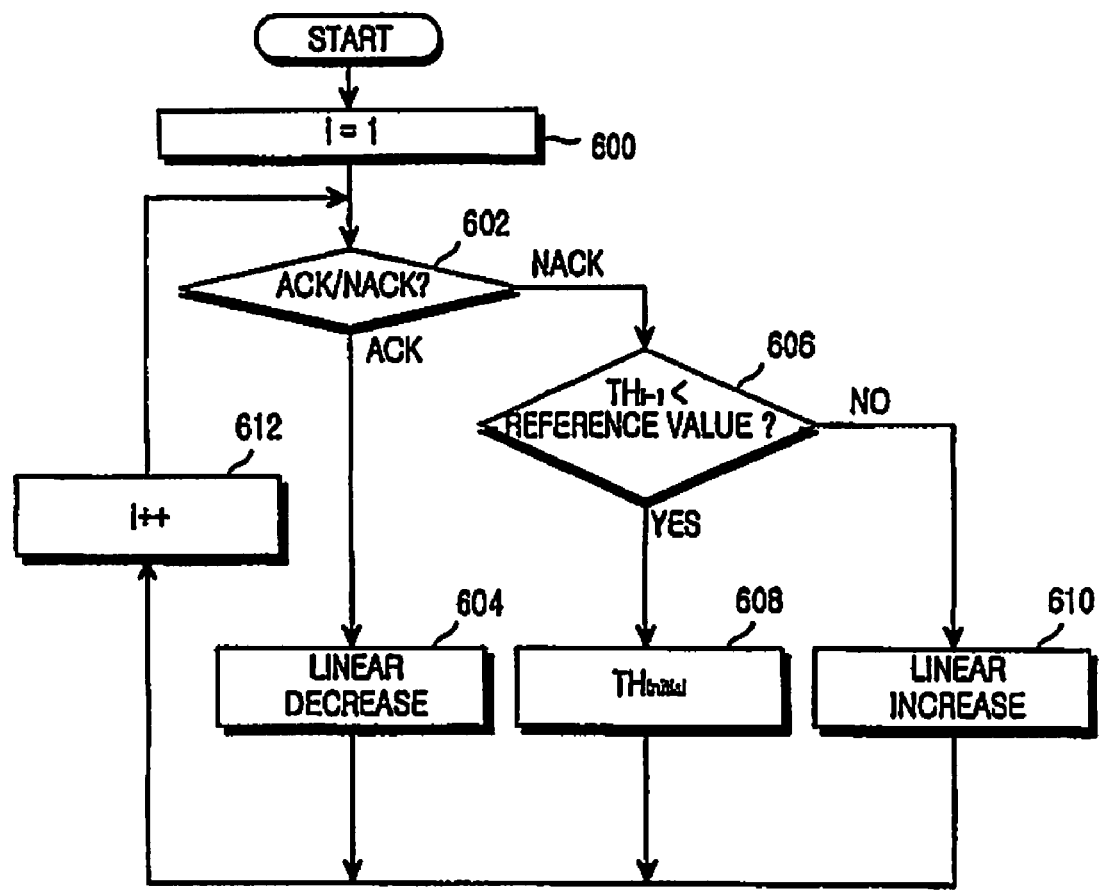
FIG. 6A is a flowchart illustrating a threshold determining operation in the second transmission mode decider illustrated in FIG. 4.

FIG. 6A is a flowchart illustrating a threshold determining operation in the second transmission mode decider 402. The second transmission mode decider 402 operates in a different manner from the first transmission mode decider 400 in that a threshold is linearly decreased directly without non-linear changes because a typical channel environment is assumed.

Referring to FIG. 6A, the second transmission mode decider 402 sets the time index i to 1 to start communications in step 600. For the first reverse link frame or feedback information, the second transmission mode decider 402 determines a transmission mode based on an initial threshold $TH_{initial}$ calculated over a typical channel. For the following frames, the second transmission mode decider 402 determines thresholds to decide on a transmission mode, as follows.

The second transmission mode decider 402 first checks the CRC check result received from the CRC checker 324 of FIG. 3 in step 602. If the CRC check result is an ACK, the second transmission mode decider 402 calculates a new threshold, $TH_i$ by subtracting a predetermined value Δ from an existing threshold $TH_{i-1}$ in step 604 and proceeds to step 612. That is, the second transmission mode decider 402 directly decreases the threshold linearly, as compared to the first transmission mode decider 400. The new threshold $TH_i$ is computed by Equation (4):

$$TH_i = TH_{i-1} - \Delta \qquad (4)$$

On the other hand, in the case of a NACK in step 602, the second transmission mode decider 402 compares the existing threshold $TH_{i-1}$ with a predetermined reference value in step 606. If the existing threshold $TH_{i-1}$ is less than the reference value, the second transmission mode decider 402 sets the initial threshold, $TH_{initial}$ as a new threshold $TH_i$ in step 608 and proceeds to step 612. Thus, in Equation (5):

$$TH_i = TH_{initial} \qquad (5)$$

If the existing threshold $TH_{i-1}$ is equal to or larger than the reference value, the second transmission mode decider 402 calculates a new threshold $TH_i$ by adding the predetermined value Δ to the existing threshold $TH_{i-1}$ in step 610 and proceeds to step 612. That is, in Equation (6):

$$TH_i = TH_{i-1} + \Delta \qquad (6)$$

Figure 6B:
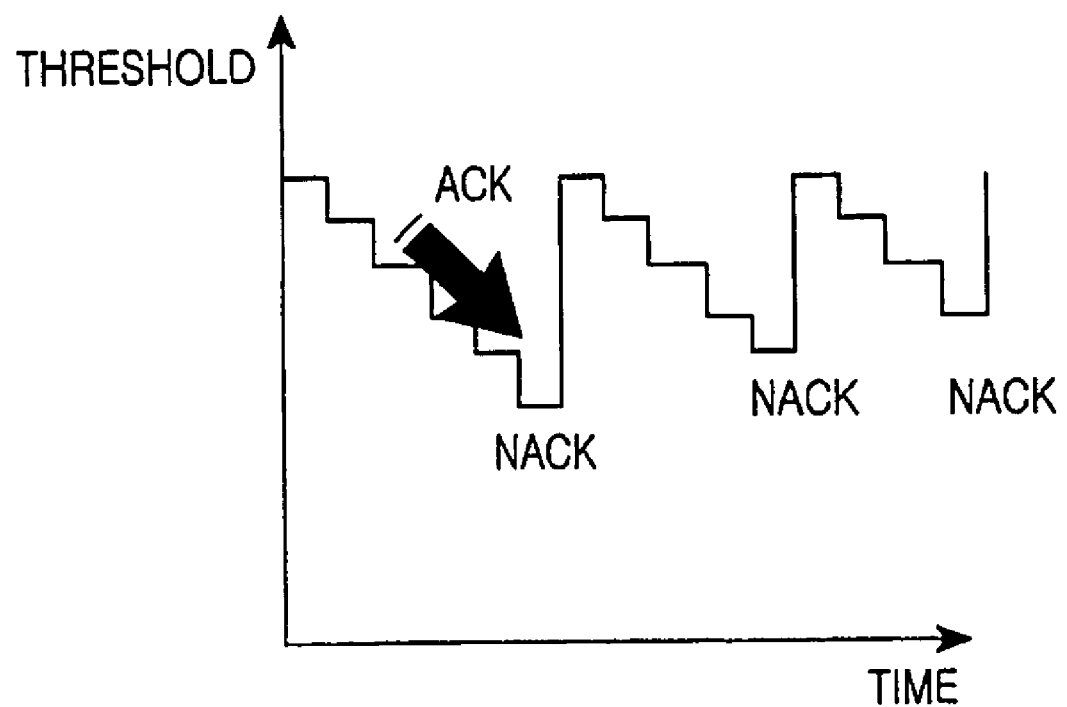
FIG. 6B is a graph illustrating changes in a threshold in a second transmission mode decider according to an embodiment of the present invention.

FIG. 6B is a graph illustrating changes in the threshold in accordance with the operation of the second transmission mode decider 402.

Referring to FIG. 6B, communications start using the initial threshold obtained under the typical channel environment. In other words, the communications start with a threshold lower than the initial threshold for the first transmission mode decider 400. If the CRC check of a received frame turns out an ACK, the existing threshold is decreased by the predetermined value Δ. If the CRC check of the received frame turns out a NACK, the existing threshold is returned to the initial threshold and then decreased linearly again in the method described above. Due to the assumption of a typical channel environment, the first CRC check result can be a NACK, as compared to the channel environment in which the first transmission mode decider 400 operates. Therefore, if a NACK occurs in the state where the existing threshold is equal to or greater than the initial threshold, a new threshold is calculated by adding the predetermined value to the existing threshold.

Figure 7A:
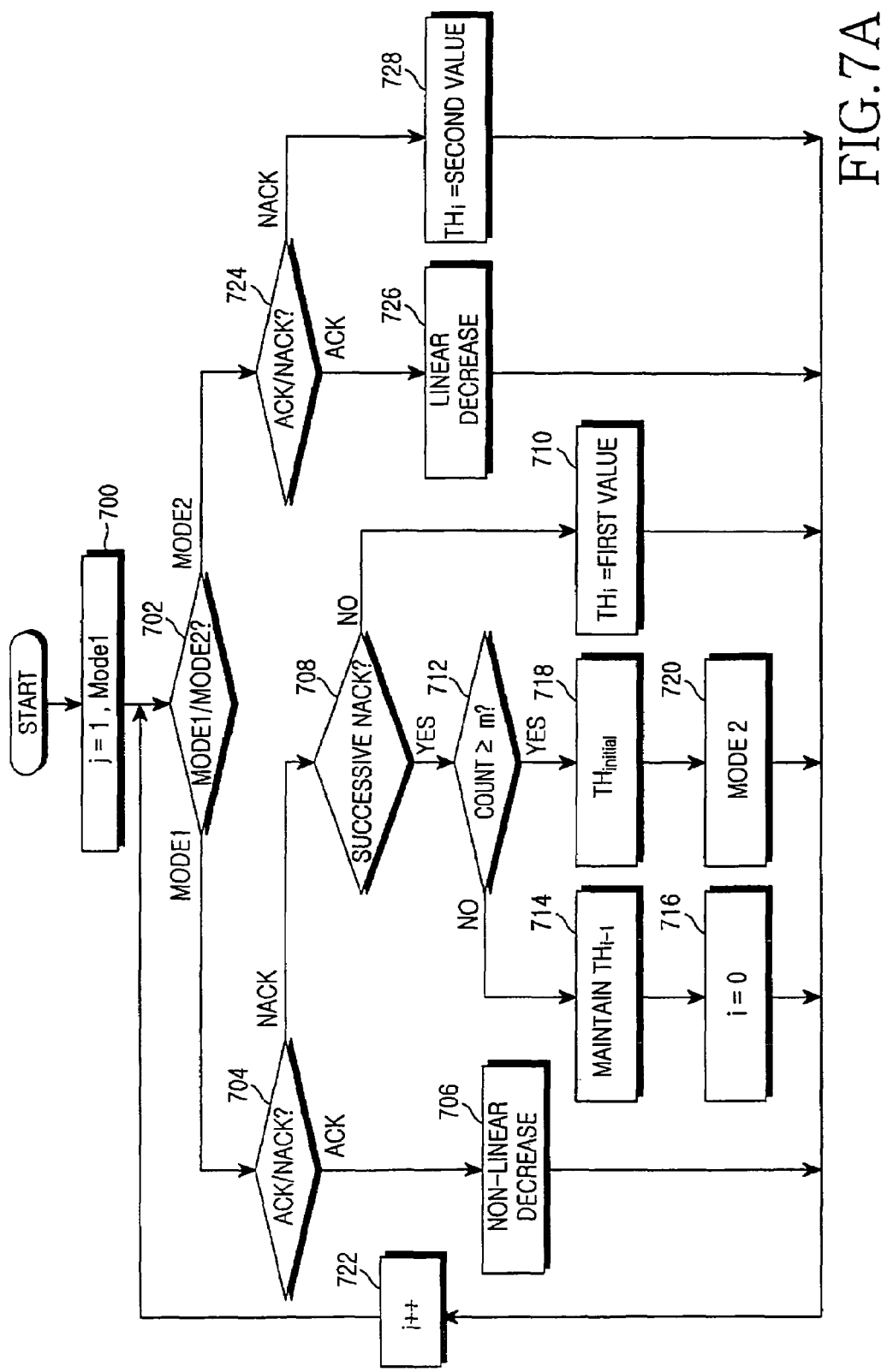
FIG. 7A is a flowchart illustrating a threshold determining operation in the third transmission mode decider illustrated in FIG. 4.

FIG. 7A is a flowchart illustrating a threshold determining operation in the third transmission mode decider 404. The third transmission mode decider 404 combines the operations of the first and second transmission mode deciders 400 and 402. Specifically, the third transmission mode decider 404 uses a threshold calculated under the severe-distortion channel environment as an initial threshold. If a NACK is generated, the third transmission mode decider 404 changes an existing threshold to a predetermined value without returning to the initial threshold. If another NACK follows, the third transmission mode decider 404 maintains the changed threshold. However, if m successive NACKs are generated, the third transmission mode decider 404 returns to the initial threshold and then operates in the same manner as the second transmission mode decider 402.

Referring to FIG. 7A, the third transmission mode decider 404 sets the time index i to 1 to start communications and initializes its operation mode to the operation of the first transmission mode decider 400 (hereinafter, referred to as a first mode) in step 700.

In step 702, the third transmission mode decider 404 checks the current operation mode. If it is the first mode, the third transmission mode decider 404 checks the CRC check result of the CRC checker 324 illustrated in FIG. 3 in step 704. If the CRC check result is an ACK, the third transmission mode decider 404 decreases an existing threshold $TH_{i-1}$ non-linearly in step 706 and proceeds to step 722. Specifically, the third transmission mode decider 404 calculates a new threshold $TH_i$ by subtracting the product of a predetermined value Δ and the time index i from the existing threshold $TH_{i-1}$, which is expressed as Equation (7):

$$TH_i = TH_{i-1} - \Delta \times i \qquad (7)$$

If the CRC check result is a NACK in step 704, the third transmission mode decider 404 determines whether the NACK is another one, that is, whether the previous CRC check result is a NACK in step 708. If the previous CRC check result is an ACK, the third transmission mode decider 404 sets the new threshold $TH_i$ to a predetermined first value in step 710 and proceeds to step 722. For example, the first value can be the threshold before the current NACK. On the contrary, if the previous CRC check result is a NACK, the third transmission mode decider 404 counts the number of successive NACKs in step 712. If the count is less than m, the third transmission mode decider 404 maintains the existing threshold $TH_{i-1}$ in step 714, sets the time index i to 0, and goes to step 722. That is, if the number of successive NACKs is less than a predetermined value, the existing threshold is kept. Hence, in Equation (8):

$$TH_i = TH_{i-1} \qquad (8)$$

Meanwhile, if the count is m or higher in step 712, the third transmission mode decider 404 sets the new threshold $TH_i$ to an initial threshold $TH_{initial}$ calculated under the worst channel environment, considering that the successive NACK occurrences arose from a bad channel condition in step 718.

In step 720, the third transmission mode decider 404 transitions to the operation mode of the second transmission mode decider 402 (hereinafter, referred to as a second mode) and proceeds to step 722. In step 722, the third transmission mode decider 404 increases the time index i by 1 and returns to step 702.

If the current operation mode is the second mode in step 702, the third transmission mode decider 404 checks the CRC check result in step 724. If the CRC check result is an ACK, the third transmission mode decider 404 decreases the existing threshold $TH_{i-1}$ linearly in step 726 and proceeds to step 722. If the CRC check result is a NACK, the third transmission mode decider 404 sets the new threshold $TH_i$ to a predetermined second value in step 728 and then goes to step 722.

Figure 7B:
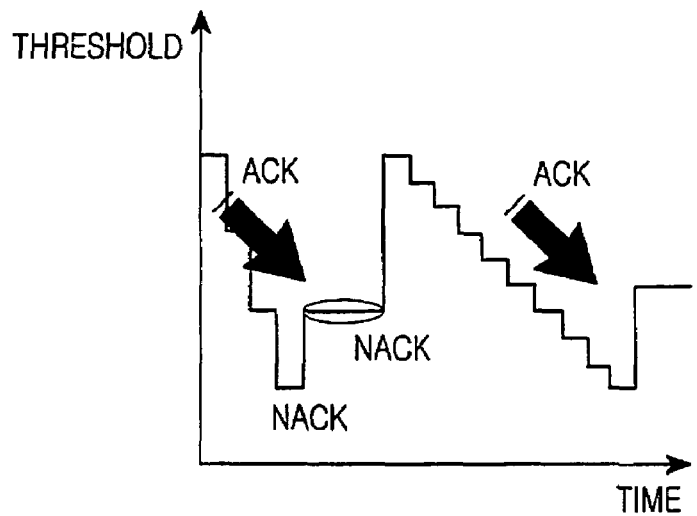
FIG. 7B is a graph illustrating changes in a threshold in a third transmission mode decider according to an embodiment of the present invention.

FIG. 7B is a graph illustrating changes in the threshold according to the operation of the third transmission mode decider 404.

Referring to FIG. 7B, communications start using the initial threshold obtained under the severe-distortion channel environment. Then, if the CRC check of a received frame turns out an ACK, the threshold is decreased non-linearly in the manner of the first transmission mode decider 400. If the CRC check of the received frame turns out a NACK, the threshold is changed to the predetermined first value. If an ACK is generated subsequently, the threshold is decreased non-linearly, and if m successive NACKs are generated, the threshold is changed to the initial threshold. Then, the threshold is changed in the manner of the second transmission mode decider 402. Specifically, in the case of an ACK, the threshold is linearly decreased, and in the case of a NACK, the threshold is changed to the predetermined second value.

The whole operation of the present invention in the above-described embodiment is summarized as follows.

The transmitter first generates a CRC for transmission data, encodes and modulates the CRC-attached transmission data, and transmits the modulated data through the transmit antennas in one of multi-antenna transmission schemes that the multi-transmission mode portion 108 supports. For the data transmission, the transmitter determines a code rate, a modulation scheme and an antenna transmission scheme according to feedback information or transmission mode information received from the receiver. For an initial transmission, a predetermined code rate, modulation scheme and antenna transmission scheme are used.

The receiver recovers a received signal and performs a CRC check on the signal. If the CRC check result is an ACK, a threshold is decreased to thereby select a transmission mode suitable for a better fading situation. If the CRC check result is a NACK, the threshold is increased to thereby select a transmission mode suitable for a worse fading situation. The threshold can be changed in the above-described three methods. As described before, the threshold adjustment is a process of adapting the SNR versus throughput graph to the current channel state to decide on a transmission mode.

In the above-described embodiment, the receiver (MS) determines a transmission mode involving a code rate, a modulation scheme and an antenna transmission scheme and feeds back transmission mode information to the transmitter (BS). It can be further contemplated as an alternative embodiment that the receiver (MS) feeds back a CQI and the CRC check result (ACK or NACK) of a frame and the transmitter (BS) determines a transmission mode based on the feedback information.

The transmitter and the receiver according to an alternative embodiment of the present invention have the configurations illustrated in FIGS. 1 and 3, respectively. Yet, they operate partially in different manners from the transmitter and the receiver in the first embodiment of the present invention described above.

Regarding the receiver illustrated in FIG. 3, all components except the feedback portion 326 operate in the same manner as in the first embodiment. The feedback portion 326 feeds back the CRC check result of the CRC checker 324 and a CQI to the transmitter 100 and the transmitter 100 determines a transmission mode based on the feedback information.

Regarding the transmitter illustrated in FIG. 1, all components except for the controller 110 operate in the same manner as in the first embodiment. The controller 110 changes SNR versus throughput graphs according to the feedback information and determines a transmission mode based on the changed graphs. Therefore, the controller 110 includes the feedback portion having the configuration illustrated in FIG. 4 and determines a transmission mode in one of the procedures illustrated in FIGS. 5A, 6A and 7A. These transmission mode deciding procedures have been described before in great detail and so, are not described again here.

The whole operation of the present invention in the alternative embodiment of the present invention is summarized as follows.

The receiver first performs a CRC check on data received from the transmitter and feeds back the CRC check result and a CQI to the transmitter.

The transmitter generates a CRC for transmission data, encodes and modulates the CRC-attached transmission data, and transmits the modulated data through the transmit antennas in one of multi-antenna transmission schemes that the multi-transmission mode portion 108 supports. For the data transmission, the transmitter determines a code rate, a modulation scheme and an antenna transmission scheme according to the feedback information or transmission mode information received from the receiver and transmits the data in the decided transmission mode. If the CRC check result is an ACK, a threshold is decreased for an SNR versus throughput graph to thereby select a transmission mode suitable for a better fading situation. If the CRC check result is a NACK, the threshold is increased to thereby select a transmission mode suitable for a worse fading situation. The threshold can be changed in the above-described three methods.

Figure 8:
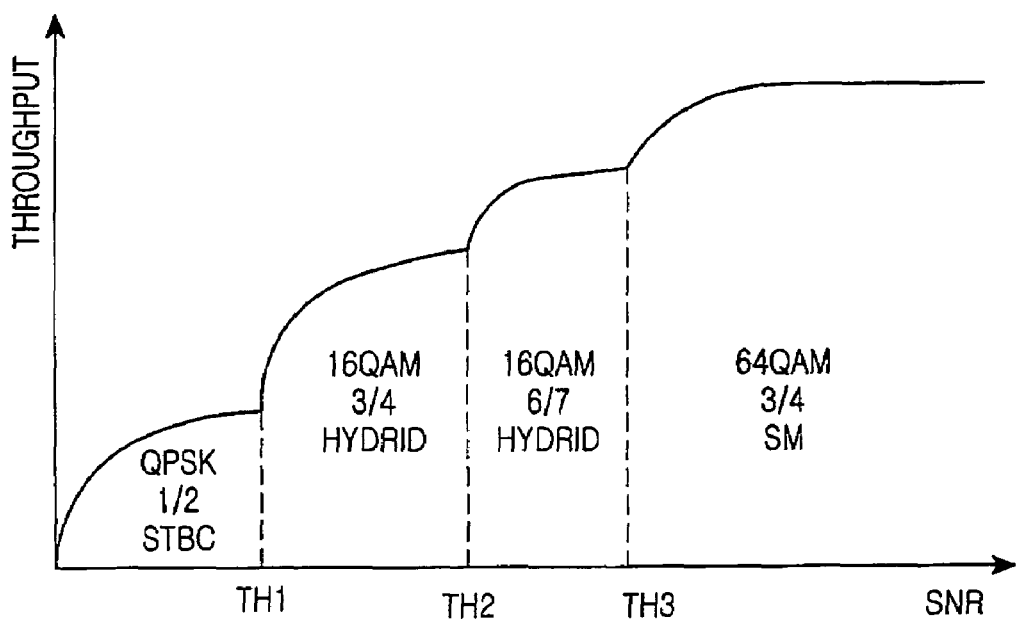
FIG. 8 is a conceptual SNR versus throughput graph according to an embodiment of the present invention.

FIG. 8 is a conceptual SNR versus throughput graph for use in determining a transmission mode according to an embodiment of the present invention. In the illustrated case, four transmission modes are defined.

Referring to FIG. 8, a first transmission mode is set for an SNR less than a first threshold, TH1. In the first transmission mode, the transmitter transmits data at a code rate of ½, in QPSK, and using the STBC scheme. A second transmission mode is set for an SNR between the first threshold, TH1 and a second threshold, TH2. In the second transmission mode, the transmitter transmits data at a code rate of ¾, in 16QAM, and using the 2-layered SM. A third transmission mode is set for an SNR between the second threshold, TH2 and a third threshold, TH3. In the third transmission mode, the transmitter transmits data at a code rate of ⅚, in 16QAM, and using the 2-layered SM. A fourth transmission mode is set for an SNR above the third threshold, TH3. In the fourth transmission mode, the transmitter transmits data at a code rate of ¾, in 64QAM, and using the SM.

As illustrated in FIG. 8, all of a code rate, a modulation scheme and an antenna transmission scheme can be controlled. Yet all these parameters do not need to be considered. For example, given a code rate, only a modulation scheme and an antenna transmission scheme are controlled.

In accordance with an embodiment of the present invention, the thresholds TH1, TH2 and TH3 are changed according to the CRC check result, thereby selecting a transmission mode suitable for the current channel state. For example, if the CRC check result is a NACK, the thresholds TH1, TH2 and TH3 are shifted to the right so that a transmission mode can be selected for a bad fading environment. On the contrary, if the CRC check result is an ACK, the thresholds TH1, TH2 and TH3 are shifted to the left so that a transmission mode can be selected for a good fading environment.

As described above, the present invention advantageously maximizes data rate using a plurality of code rates and a plurality of modulation schemes. Also, an AMC scheme with a minimal error probability is extended to a multi-antenna scheme, thereby enabling implementation of a more efficient communication system with a maximal data rate and a minimal error probability. As an optimal transmission method is selected according to a channel environment, a more reliable communication system can be implemented. Furthermore, the design of a more efficient transmission mode decider based on a real fading environment enables realization of an efficient communication system.

While the invention has been shown and described with reference to certain preferred embodiments thereof, they are merely exemplary applications. For instance, while frame errors are checked by means of a CRC (or frame error check: FEC) in the embodiments of the present invention, any other method such as parity check is available. Also, while SNR is used as a CQI to determine a transmission mode in the embodiments, Ec/Io or C/I can be used instead. Therefore, it will be understood by those skilled in the art that various changes in form and details may be made therein without departing from the spirit and scope of the invention as defined by the appended claims.

What is claimed is:

1. A receiver in a multiple-input multiple-output (MIMO) mobile communication system, comprising:
    an error checker for checking errors in received data and outputting an error check result; and
    a feedback portion for adaptively changing a threshold associated with a channel state according to the error check result, determining a transmission mode by comparing the changed threshold with a measured channel quality indicator (CQI), and feeding back information related to a transmission mode to a transmitter;
        wherein, in a first operation mode, the feedback portion uses a threshold calculated under a severe-distortion channel environment as an initial threshold, non-linearly decreases an existing threshold if the error check result is an acknowledgement (ACK) and the existing threshold is greater than or equal to a first predetermined reference value, linearly decreases the existing threshold if the error check result is an ACK and the existing threshold is less than the predetermined reference value, and changes the existing threshold to the initial threshold if the error check result is a non-acknowledgement (NACK).

2. The receiver of claim 1, wherein the error check result is a cyclic redundancy code (CRC) check result.

3. The receiver of claim 1, wherein the CQI is a signal-to-noise ratio (SNR).

4. The receiver of claim 1, wherein the transmission mode is at least one of a coding method, a modulation scheme, and an antenna transmission scheme.

5. The receiver of claim 1, wherein, in a second operation mode, the feedback portion uses a threshold calculated under a typical channel environment as the initial threshold, linearly decreases the existing threshold if the error check result is an ACK, and changes the existing threshold to the initial threshold if the error check result is a NACK where the existing threshold is less than a second reference value.

6. The receiver of claim 5, wherein if the error check result is a NACK where the existing threshold is greater than or equal to the second reference value, the feedback portion increases the existing threshold by a predetermined value.

7. The receiver of claim 1, wherein, in a third operation mode, the feedback portion uses the threshold calculated under the severe-distortion channel environment as the initial threshold, non-linearly decreases the existing threshold if a current error check result is an ACK, changes the existing threshold to a predetermined first value if a previous error check result is an ACK and the current error check result is a non-acknowledgement (NACK), counts a number of successive NACKs if the previous error check result is a NACK and the current error check result is another NACKT wherein, if the number of successive NACKs is below a predetermined value, maintains the existing threshold, and wherein, if the number of successive NACKs is the predetermined value or above, changes the existing threshold to the initial threshold and linearly decreases the initial threshold if an ACK is thereafter generated or changes the initial threshold to a predetermined second value if a NACK is thereafter generated.

8. The receiver of claim 1, further comprising:
    a demodulator for generating code symbols by demodulating received modulated symbols; and
    a decoder for recovering data transmitted from the transmitter by decoding the code symbols.

9. The receiver of claim 1, wherein the feedback portion includes a database associated with an SNR versus throughput curve, adaptively adjusts thresholds according to the error check result, the thresholds dividing the SNR versus throughput curve into a plurality of regions, and feeds back information related to the a transmission mode corresponding to a region within which an SNR measurement falls.

10. A transmitter in a multiple-input multiple-output (MIMO) mobile communication system, comprising:
    a receiving portion for receiving a channel quality indicator (CQI) and an error check result of transmitted data from a mobile station (MS); and
    a controller for adaptively changing a threshold associated with a channel state according to the error check result and determining a transmission mode by comparing the changed threshold with the received CQI;
        wherein, in a first operation mode, the controller uses a threshold calculated under a severe-distortion channel environment as an initial threshold, non-linearly decreases an existing threshold if the error check result is an acknowledgement (ACK) and the existing threshold is greater than or equal to a first predetermined reference value, linearly decreases the existing threshold if the error check result is an ACK and the existing threshold is less than the predetermined reference value, and changes the existing threshold to the initial threshold if the error check result is a non-acknowledgement (NACK).

11. The transmitter of claim 10, wherein the error check result is a cyclic redundancy code (CRC) check result.

12. The transmitter of claim 10, wherein the CQI is a signal-to-noise ratio (SNR).

13. The transmitter of claim 10, wherein the transmission mode is at least one of a coding method, a modulation scheme, and an antenna transmission scheme.

14. The transmitter of claim 10, wherein, in a second operation mode, the controller uses a threshold calculated under a typical channel environment as the initial threshold, linearly decreases the existing threshold if the error check result is an ACK, and changes the existing threshold to the initial threshold if the error check result is a NACK where the existing threshold is less than a second reference value.

15. The transmitter of claim 14, wherein if the error check result is a NACK where the existing threshold is greater than or equal to a the second reference value, then the controller increases the existing threshold by a predetermined value.

16. The transmitter of claim 10, wherein, in a third operation mode, the controller uses the threshold calculated under the severe-distortion channel environment as the initial threshold, non-linearly decreases the existing threshold if a current error check result is an ACK, changes the existing threshold to a predetermined first value if a previous error check result is an ACK and the current error check result is a non-acknowledgement (NACK), maintains the existing threshold if the previous error check result is a NACK and the current error check result is another NACK, changes the existing threshold to the initial threshold if a number of successive NACKs is a predetermined value or above and linearly decreases the initial threshold if an ACK is thereafter generated or changes the initial threshold to a predetermined second value if a NACK is thereafter generated.

17. The transmitter of claim 10, further comprising:
an encoder for encoding transmission data at a predetermined code rate;
a modulator for modulating the coded data in a predetermined modulation scheme; and
a multi-transmission mode portion for generating a plurality of antenna signals by encoding the modulated data in a predetermined antenna transmission scheme,
wherein the controller controls at least one of the code rate, the modulation scheme and the antenna transmission scheme according to the determined transmission mode.

18. The transmitter of claim 17, wherein the antenna transmission scheme is one of spatial multiplexing (SM) offering a high data rate, space-time block coding (STBC) offering a high diversity gain, and a hybrid method being a combination of SM and STBC.

19. The transmitter of claim 10, wherein the controller includes a database associated with an SNR versus throughput curve, adaptively adjusts thresholds according to the error check result, the thresholds dividing the SNR versus throughput curve into a plurality of regions, and feeds back information related to the transmission mode corresponding to a region within which an SNR measurement falls.

20. A feed-back method in a receiver in a multiple-input multiple-output (MIMO) mobile communication system, comprising the steps of:
checking errors in received data and outputting an error check result;
non-linearly decreasing an existing threshold if the error check result is an acknowledgement (ACK);
determining, if the error check result is a non-acknowledgement (NACK), whether a previous error check result is an ACK or a NACK and increasing the existing threshold to a predetermined first value if the previous error check result is an ACKT and counting a number of successive NACKs if the previous error check result is a NACK, wherein, if the count is less than a predetermined value, maintaining the existing threshold and wherein, if the count is greater than or equal to the predetermined value, changing the existing threshold to an initial threshold and linearly decreasing the initial threshold if an ACK thereafter follows or changing the initial threshold to a predetermined second value if a NACK thereafter follows; and
determining a transmission mode by comparing the changed threshold with a measured channel quality indicator (CQI), and feeding back information related to a transmission mode to a transmitter.

21. The feed-back method of claim 20, wherein the error check result is a cyclic redundancy code (CRC) check result.

22. The feed-back method of claim 20, wherein the CQI is a signal-to-noise ratio (SNR).

23. The feed-back method of claim 20, wherein the transmission mode is at least one of a coding method, a modulation scheme, and an antenna transmission scheme.

24. A feed-back method in a receiver in a multiple-input multiple-output (MIMO) mobile communication system, comprising the steps of:
checking errors in received data and outputting an error check result;
non-linearly decreasing an existing threshold if the error check result is an acknowledgement (ACK) and the existing threshold is greater than or equal to a predetermined reference value;
linearly decreasing the existing threshold if the error check result is an ACK and the existing threshold is less than the predetermined reference value;
changing the existing threshold to the initial threshold if the error check result is a non-acknowledgement (NACK); and
determining a transmission mode by comparing the changed threshold with a measured channel quality indicator (CQI), and feeding back information related to a transmission mode to a transmitter.

25. A feed-back method in a receiver in a multiple-input multiple-output (MIMO) mobile communication system, comprising the steps of:
checking errors in received data and outputting an error check result;
linearly decreasing an existing threshold if the error check result is an acknowledgement (ACK);
changing the existing threshold to an initial threshold if the error check result is a non-acknowledgement (NACK) where the existing threshold is less than a reference value;
increasing the existing threshold by a predetermined value if the error check result is a NACK where the existing threshold is greater than or equal to the reference value; and
determining a transmission mode by comparing the changed threshold with a measured channel quality indicator (CQI), and feeding back transmission mode information to a transmitter.

26. A transmitting method in a multiple-input multiple-output (MIMO) mobile communication system, comprising the steps of:
receiving a channel quality indicator (CQI) and an error check result of transmitted data from a receiver;
non-linearly decreasing an existing threshold if the error check result is an acknowledgement (ACK);
determining, if the error check result is a non-acknowledgement (NACK), whether a previous error check result is an ACK or a NACK and increasing the existing threshold to a predetermined first value if the previous error check result is an ACK and counting a number of successive NACKs if the previous error check result is a NACK, wherein, if the count is less than a predetermined value, maintaining the existing threshold and wherein, if the count is greater than or equal to the predetermined value, changing the existing threshold to an initial threshold and linearly decreasing the initial threshold if an ACK thereafter follows or changing the initial threshold to a predetermined second value if a NACK thereafter follows; and determining a transmission mode by comparing the changed threshold with the received CQI.

27. The transmitting method of claim 26, wherein the error check result is a cyclic redundancy code (CRC) check result.

28. The transmitting method of claim 26, wherein the CQI is a signal-to-noise ratio (SNR).

29. The transmitting method of claim 26, wherein the transmission mode is at least one of a coding method, a modulation scheme, and an antenna transmission scheme.

30. A transmitting method in a multiple-input multiple-output (MIMO) mobile communication system, comprising the steps of:

receiving a channel quality indicator (CQI) and an error check result of transmitted data from a receiver;

non-linearly decreasing an existing threshold if the error check result is an acknowledgement (ACK) and the existing threshold is greater than or equal to a predetermined reference value;

linearly decreasing the existing threshold if the error check result is an ACK and the existing threshold is less than the predetermined reference value; and changing the existing threshold to the initial threshold if the error check result is a non-acknowledgement (NACK); and determining a transmission mode by comparing the changed threshold with the received CQI.

31. A transmitting method in a multiple-input multiple-output (MIMO) mobile communication system, comprising the steps of:

receiving a channel quality indicator (CQI) and an error check result of transmitted data from a receiver;

linearly decreasing an existing threshold if the error check result is an acknowledgement (ACK);

changing the existing threshold to an initial threshold if the error check result is a non-acknowledgement (NACK) where the existing threshold is less than a reference value;

increasing the existing threshold by a predetermined value if the error check result is a NACK where the existing threshold is greater than or equal to the reference value; and determining a transmission mode by comparing the changed threshold with the received CQI.

* * * * *

UNITED STATES PATENT AND TRADEMARK OFFICE
CERTIFICATE OF CORRECTION

PATENT NO. : 7,593,486 B2 Page 1 of 1
APPLICATION NO. : 11/152456
DATED : September 22, 2009
INVENTOR(S) : Jeong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Twenty-first Day of September, 2010

David J. Kappos
*Director of the United States Patent and Trademark Office*